United States Patent
Norskog et al.

(10) Patent No.: US 6,795,056 B2
(45) Date of Patent: Sep. 21, 2004

(54) SYSTEM AND METHOD FOR REDUCING POWER CONSUMPTION IN AN OPTICAL SCREEN POINTING DEVICE

(75) Inventors: Allen C. Norskog, Fort Collins, CO (US); Mark A. Anderson, Fort Collins, CO (US)

(73) Assignee: Agilent Technologies, Inc., Palo Alto, CA (US)

( * ) Notice: Subject to any disclaimer, the term of this patent is extended or adjusted under 35 U.S.C. 154(b) by 143 days.

(21) Appl. No.: 09/912,190

(22) Filed: Jul. 24, 2001

(65) Prior Publication Data

US 2003/0020688 A1 Jan. 30, 2003

(51) Int. Cl.[7] .................................................. G09G 5/08
(52) U.S. Cl. ...................... 345/158; 345/157; 345/159; 345/160; 345/170; 345/166; 345/211; 382/313; 382/314; 382/315
(58) Field of Search .................................. 345/157, 158, 345/159, 160, 170, 211, 166; 382/313, 314, 315

(56) References Cited

U.S. PATENT DOCUMENTS

| | | | |
|---|---|---|---|
| 4,847,484 A | * | 7/1989 | Kikuchi ..................... 250/221 |
| 5,578,813 A | | 11/1996 | Allen et al. |
| 5,644,139 A | | 7/1997 | Allen et al. |
| 5,786,804 A | | 7/1998 | Gordon |
| 5,994,710 A | | 11/1999 | Knee et al. |
| 6,057,540 A | | 5/2000 | Gordon et al. |
| 6,151,015 A | | 11/2000 | Badyal et al. |
| 6,256,016 B1 | * | 7/2001 | Piot et al. .................... 345/166 |
| 6,297,513 B1 | | 10/2001 | Oliver et al. |
| 6,455,840 B1 | | 9/2002 | Oliver et al. |
| 6,585,158 B2 | * | 7/2003 | Norskog ................ 235/462.13 |

OTHER PUBLICATIONS

"Seeing Eye" Mouse for a Computer System, U.S. patent application Ser. No. 09/052,046, filed Mar. 30, 1998.

* cited by examiner

Primary Examiner—Richard Hjerpe
Assistant Examiner—Jean Lesperance (57) ABSTRACT

An apparatus for controlling the position of a screen pointer for an electronic device having a display screen includes a light source for illuminating an imaging surface, thereby generating reflected images. The apparatus includes a motion transducer. A lens receives the reflected images and directs the reflected images onto the motion transducer. The motion transducer includes an electronic shutter for controlling the amount of time that light is collected for image frames. The motion transducer is configured to generate digital representations of the reflected images. The motion transducer is configured to generate movement data based on the digital representations of the reflected images. The movement data is indicative of relative motion between the imaging surface and the motion transducer. A controller coupled to the light source turns the light source on only during the time that light is being collected for an image frame.

11 Claims, 4 Drawing Sheets

SYSTEM AND METHOD FOR REDUCING POWER CONSUMPTION IN AN OPTICAL SCREEN POINTING DEVICE

REFERENCE TO RELATED PATENTS

This Application is related to the subject matter described in the following U.S. patents: U.S. Pat. No. 5,578,813, filed Mar. 2, 1995, issued Nov. 26, 1996, and entitled FREE-HAND IMAGE SCANNING DEVICE WHICH COMPENSATES FOR NON-LINEAR MOVEMENT; U.S. Pat. No. 5,655,139, filed Aug. 14, 1996, issued Jul. 1, 1997, and entitled NAVIGATION TECHNIQUE FOR DETECTING MOVEMENT OF NAVIGATION SENSORS RELATIVE TO AN OBJECT; and U.S. Pat. No. 5,786,804, filed Oct. 6, 1995, issued Jul. 28, 1998, and entitled METHOD AND SYSTEM FOR TRACKING ATTITUDE. These three patents describe techniques of tracking position movement. Those techniques are a component in a preferred embodiment described below. Accordingly, U.S. Pat. Nos. 5,578,813, 5,644,139, and 5,786,804 are hereby incorporated herein by reference.

This application is also related to the subject matter described in U.S. Pat. No. 6,057,540, filed Apr. 30, 1998, issued May 2, 2000, and entitled MOUSELESS OPTICAL AND POSITION TRANSLATION TYPE SCREEN POINTER CONTROL FOR A COMPUTER SYSTEM; U.S. Pat. No. 6,151,015, filed Apr. 27, 1998, issued Nov. 21, 2000, and entitled PEN LIKE COMPUTER SYSTEM; and U.S. patent application Ser. No. 09/052,046, filed Mar. 30, 1998, entitled SEEING EYE MOUSE FOR A COMPUTER SYSTEM. These two related patents and patent application describe screen pointing devices based on techniques described in U.S. Pat. Nos. 5,578,813, 5,644,139, and 5,786,804. Therefore U.S. Pat. Nos. 6,057,540 and 6,151,015, and U.S. patent application Ser. No. 09/052,046, filed Mar. 30, 1998, entitled SEEING EYE MOUSE FOR A COMPUTER SYSTEM, are hereby incorporated herein by reference.

THE FIELD OF THE INVENTION

This invention relates generally to devices for controlling a cursor on a display screen, also known as pointing devices. This invention relates more particularly to a system and method for reducing power consumption in an optical pointing device.

BACKGROUND OF THE INVENTION

The use of a hand operated pointing device for use with a computer and its display has become almost universal. By far the most popular of the various devices is the conventional (mechanical) mouse, used in conjunction with a cooperating mouse pad. Centrally located within the bottom surface of the mouse is a hole through which a portion of the underside of a rubber-surfaced steel ball extends. The mouse pad is typically a closed cell foam rubber pad coveted with a suitable fabric. Low friction pads on the bottom surface of the mouse slide easily over the fabric, but the rubber ball does not skid. Rather, the rubber ball rolls over the fabric as the mouse is moved. Interior to the mouse are rollers, or wheels, that contact the ball at its equator and convert its rotation into electrical signals representing orthogonal components of mouse motion. These electrical signals are coupled to a computer, where software responds to the signals to change by a $\Delta X$ and a $\Delta Y$ the displayed position of a pointer (cursor) in accordance with movement of the mouse. The user moves the mouse as necessary to get the displayed pointer to a desired location or position. Once the pointer on the screen points at an object or location of interest, a button on the mouse is activated with the fingers of the hand holding the mouse. The activation serves as an instruction to take some action, the nature of which is defined by software in the computer.

In addition to mechanical types of pointing devices like a conventional mouse, optical pointing devices have also been developed, such as those described in the incorporated patents and patent application. In one form of an optical pointing device, rather than using a moving mechanical element like a ball in a conventional mouse, relative movement between an imaging surface, such as a finger or a desktop, and photo detectors within the optical pointing device, is optically sensed and converted into movement information.

It would be desirable to reduce the power typically consumed by an optical pointing device. Limiting power consumption is particularly important for portable electronic devices, such as portable computers, cellular telephones, personal digital assistants (PDAs), digital cameras, portable game devices, pagers, portable music players (e.g., MP3 players), and other similar devices that might incorporate an optical pointing device.

Some optical motion sensors for optical pointing devices include a low-power mode that is automatically entered if no motion is detected for a period of time. In low power mode, power savings is achieved by turning off a light source of the optical pointing device. The light source is a major contributor to power consumption. The light source is turned back on if the optical motion sensor detects any movement, or the light source is periodically turned back on to facilitate motion detection. In some existing optical motion sensors, an undesirable switch from the low power mode to a full power mode can be caused by noise. If the optical motion sensor is on a border between pixels, the optical motion sensor may report oscillations in motion as it attempts to determine whether it is positioned just over or just under the next pixel step threshold, which causes the optical motion sensor to leave the low power mode. In addition, reasonably slow drift motions, such as those caused by vibrations around an optical mouse, or those caused by placing an optical mouse on a surface with a slight incline, can cause an optical motion sensor to undesirably exit the low power mode.

In the low power mode in some optical motion sensors, images are captured, but at a significantly reduced rate compared to the rate at which images are captured in the full power mode. Some optical motion sensors provide 1500 "frame periods" per second. An image may or may not be captured during a frame period. For example, in full power mode, an image may be captured during each frame period, resulting in 1500 images per second. In low power mode, an image may only be captured every 10 or 12 frame periods, resulting in 125–150 images per second. In full power mode, the light source typically remains on for all frame periods, and is not turned off during a frame period or between frame periods. In low power mode, the light source is typically turned on only during frame periods when images are captured, but remains on for the duration of those frame periods. Turning the light source on for only one frame period out of every 10 frame periods results in a reduction of the power used for illumination of about 90 percent. It would be desirable to provide further power savings in the low power mode, as well as a reduction in power consumption in the full power mode.

Regardless of which mode an optical motion sensor is in, the light source remains on for the entire frame period when an image is captured. However, light is only needed for a small portion of a frame period. A frame period includes three phases—an integration phase, an analog to digital conversion phase, and an image processing phase. Light is only needed during a portion of the integration phase when an "electronic shutter" is open, allowing light to be collected. Power is unnecessarily consumed by leaving the light source on for the entire frame period.

It would be desirable to provide an optical screen pointing device with reduced power consumption.

SUMMARY OF THE INVENTION

One form of the present invention provides an apparatus for controlling the position of a screen pointer for an electronic device having a display screen. The apparatus includes a light source for illuminating an imaging surface, thereby generating reflected images. The apparatus includes a motion transducer. A lens receives the reflected images and directs the reflected images onto the motion transducer. The motion transducer includes an electronic shutter for controlling the amount of time that light is collected for image frames. The motion transducer is configured to generate digital representations of the reflected images. The motion transducer is configured to generate movement data based on the digital representations of the reflected images. The movement data is indicative of relative motion between the imaging surface and the motion transducer. A controller coupled to the light source turns the light source on only during the time that light is being collected for an image frame.

Another form of the present invention provides a method of controlling the position of a screen pointer for an electronic device having a display screen. Light is directed from a light source onto an imaging surface, thereby generating reflected images. The reflected images are focused onto an array of photo detectors. Output values of the photo detectors are digitized, thereby generating digital representations of the reflected images. At least one version of a first one of the digital representations is correlated with at least one version of a second one of the digital representations to generate motion data indicative of relative motion between the imaging surface and the array of photo detectors. The light source is turned off during the digitizing and correlating steps. The position of the screen pointer is adjusted in accordance with the motion data.

Another form of the present invention provides an apparatus for controlling the position of a screen pointer for an electronic device having a display screen. The apparatus includes a light source for illuminating an imaging surface, thereby generating reflected images. The apparatus includes a motion transducer. A lens receives the reflected images and directs the reflected images onto the motion transducer. The motion transducer includes an electronic shutter for controlling the amount of time that light is collected for image frames. The motion transducer is configured to generate digital representations of the reflected images. The motion transducer is configured to generate movement data based on the digital representations of the reflected images. The movement data is indicative of relative motion between the imaging surface and the motion transducer. A controller calculates a time average of the movement data. The controller is configured to determine whether to switch the apparatus from a low power mode to a full power mode based on the calculated time average.

Another form of the present invention provides a method of switching an optical screen pointing device from a low power mode to a fall power mode. A first movement is detected with the optical screen pointing device. A first value representing an amount of the first movement is calculated. An accumulated movement value representing an accumulation of previously detected movements is stored. The accumulated movement value is updated by adding the first value. The updated accumulated movement value is compared to a threshold value. It is determined whether to switch to the full power mode based on the comparison of the updated accumulated movement value and the threshold value.

DESCRIPTION OF THE PREFERRED EMBODIMENTS

In the following detailed description of the preferred embodiments, reference is made to the accompanying drawings, which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims.

Figure 1:
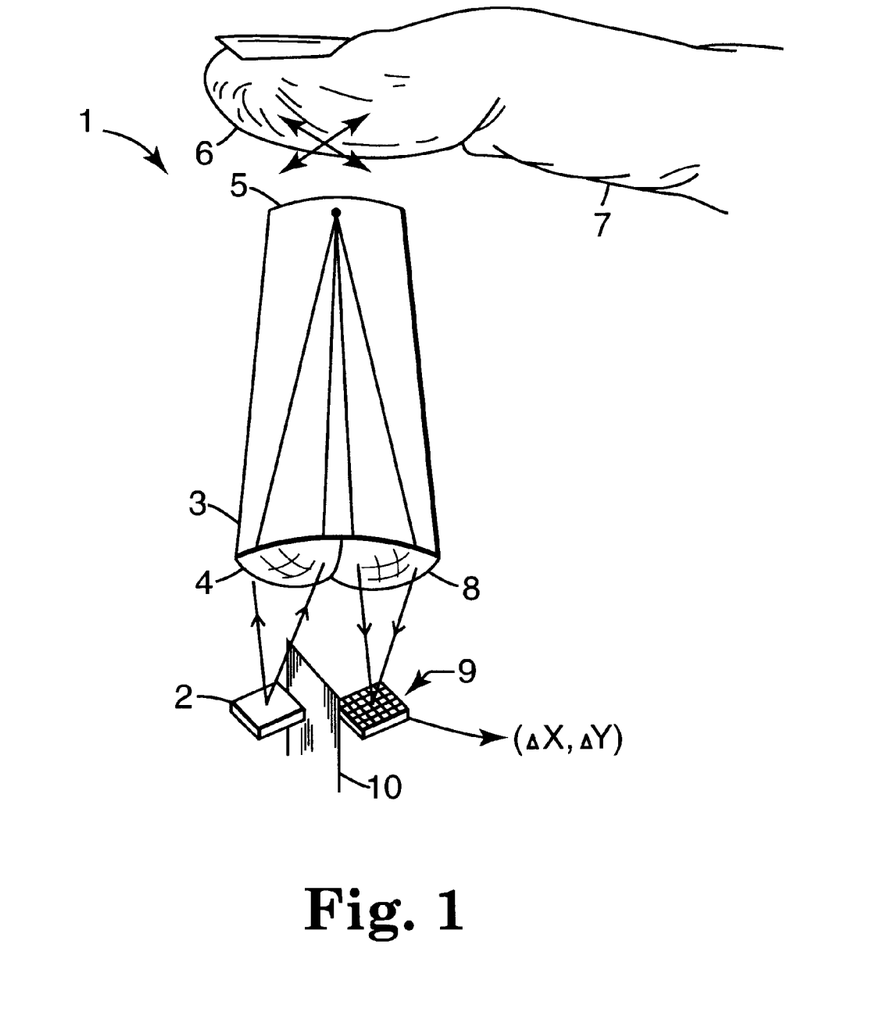
FIG. 1 is a pictographic side view illustrating the main components of an optical, motion translation type screen pointer device according to one embodiment of the present invention.

FIG. 1 shows a simplified representation of a side view of a motion detection device 1 suitable for tracking the movement of a human finger 7 pressed against a surface 5 of a transparent stud 3. A motion detection device like that shown in FIG. 1 is described in detail in the above-incorporated U.S. Pat. No. 6,057,540 (the '540 patent). The operation of motion detection device 1 is also summarized below.

When the tip 6 of finger 7 is pressed against surface 5, the ridges of skin and any other micro texture features are visible in the plane of surface 5, just as if they were a part of surface 5. Lens 8 focuses light from those features onto an array of photo detectors, which is part of movement sensor 9. Movement sensor 9 automatically acquires and tracks any suitable image. When tracking an image, movement sensor 9 produces incremental (X, Y) signals.

Lifting fingertip 6 away from surface 5 produces a loss of tracking. This condition is detected within motion detector 9, and in one embodiment, the production of incremental (X, Y) signals ceases. This has the effect of leaving the position of the screen pointer unchanged at whatever location it currently occupies, and is exactly the same as when a user of a mouse removes his hand from the mouse. When fingertip 6 is subsequently replaced on surface 5, motion detector 9 appreciates that an image has been acquired, and, in one embodiment, treats that acquisition as though a reset has been performed. That is, until there has been new motion subsequent to the new acquisition, the incremental coordinates (X, Y) will have the value (0, 0). This leaves the existing position of the screen pointer undisturbed until such time as it is deliberately moved by the motion of fingertip 6, and corresponds exactly to a mouse user's placement of his hand back on the mouse without moving it.

An LED 2, which is an IR LED in one embodiment, emits light that is projected by lens 4 onto a region 5 that is part of a work surface 6 to be imaged for navigation. In one embodiment, motion sensor 9 is an integrated circuit (IC) having an array of photo detectors, memory, and arithmetic circuits arranged to implement image correlation and tracking functions described herein and in the incorporated patents. An image of the illuminated region 6 is projected through an optical window (which may be transparent stud 3 itself) to a package (not shown) of integrated circuit 9 and onto the array of photo detectors. Lens 8 aids in the projection of the image onto the photo detectors.

One preferred optical navigation technique used by motion detection device 1 involves optically detecting motion by directly imaging as an array of pixels the various particular optical features visible at surface 5, much as human vision is believed to do. IR light reflected from a textured work surface pressed against surface 5 is focused onto a suitable array (e.g., 16×16 or 24×24) of photo detectors. The responses of the individual photo detectors are digitized to a suitable resolution and stored as a frame into corresponding locations within an array of memory.

Figure 2:
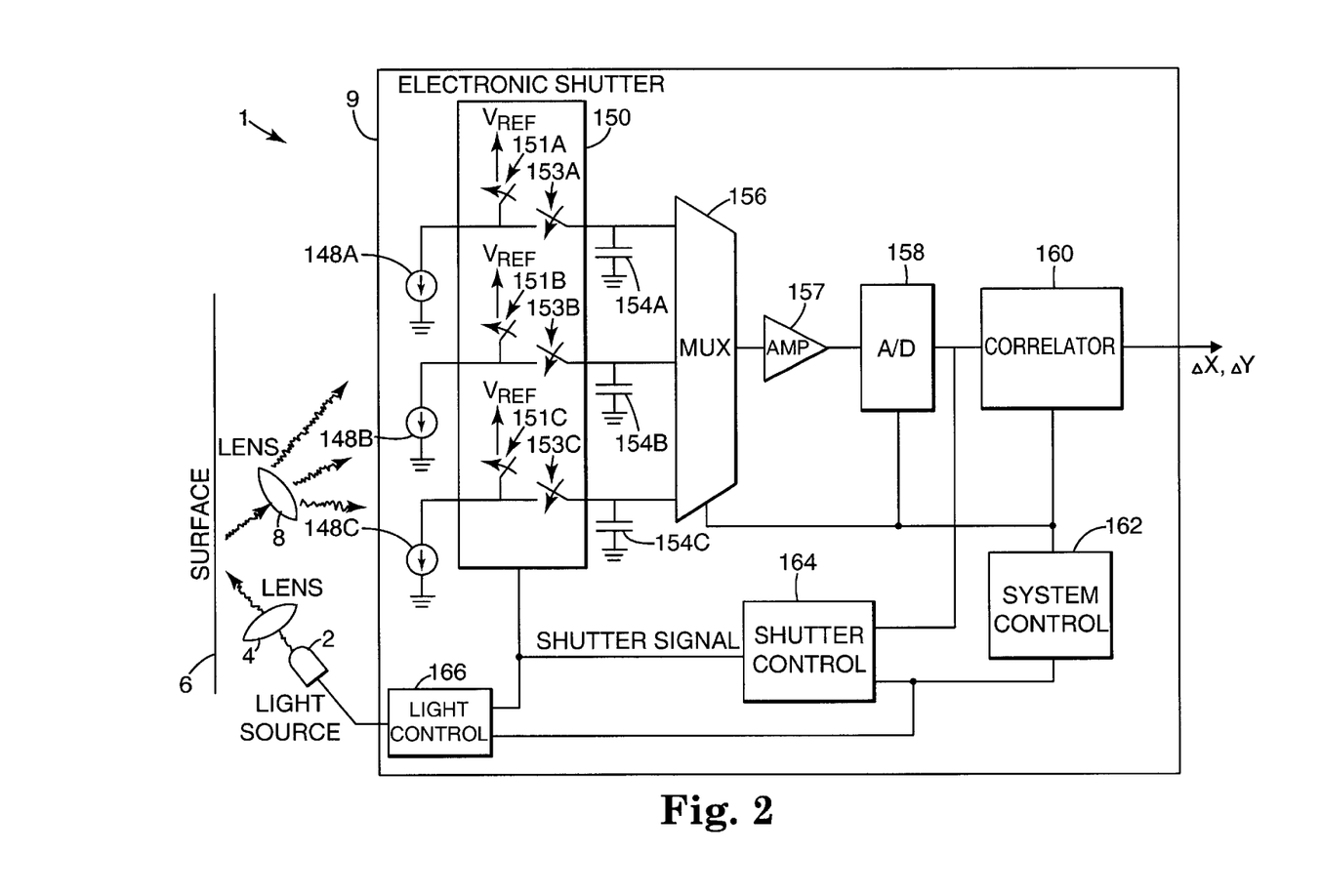
FIG. 2 is an electrical block diagram illustrating major components of one embodiment of a screen pointing device according to the present invention.

FIG. 2 shows an electrical block diagram illustrating major components of motion detection device 1. Motion detection device 1 includes light source 2, lenses 4 and 8, and motion sensor 9. Motion sensor 9 includes light sensitive current sources 148A–148C (collectively referred to as current sources 148), electronic shutter 150 having a first plurality of switches 151A–151C (collectively referred to as switches 151) and a second plurality of switches 153A–153C (collectively referred to as switches 153). Motion sensor 9 also includes a plurality of sense capacitors 154A–154C (collectively referred to as sense capacitors 154), multiplexer 156, amplifier 157, analog to digital (A/D) converter 158, correlator 160, system controller 162, shutter controller 164, and light controller 166. In an alternative embodiment, only a single lens 8 is used, rather than two lenses 4 and 8.

The operation of motion sensor 9 is primarily controlled by system controller 162, which is coupled to multiplexer 156, A/D converter 158, correlator 160, shutter controller 164, and light controller 166. In operation, according to one embodiment, light source 2 emits light that is projected by lens 4 or to surface 6, which is a fingertip in one form of the invention. In an alternative embodiment, screen pointer device 1 takes the form of an optical mouse, and surface 6 is a suitable surface for an optical mouse, such as a desktop. Light source 2 is controlled by signals from light controller 166. Reflected light from surface 6 is directed by lens 8 to light sensitive current sources 148. Current sources 148 represent an array of photo detectors, and are also referred to as photo detectors 148. Photo detectors 148 each provide a current that varies in magnitude based upon the intensity of light incident on the photo detectors 148.

Shutter switches 151 and 153 are controlled by a shutter signal from shutter controller 164. Electronic shutter 150 is "open" when switches 151 are open and switches 153 are closed, and electronic shutter 150 is "closed" when switches 153 are open. When shutter switches 151 are open and shutter switches 153 are closed (i.e., electronic shutter 150 is open), charge accumulates on sense capacitors 154, creating a voltage that is related to the intensity of light incident on photo detectors 148. When shutter switches 153 are opened (i.e., electronic shutter 150 is closed), no further charge accumulates or is lost from sense capacitors 154. Multiplexer 156 connects each sense capacitor 154 in turn to amplifier 157 and A/D converter 158, to amplify and convert the voltage from each sense capacitor 154 to a digital value. Sense capacitors 154 are then discharged by closing switches 151 and 153. After discharging sense capacitors 154, switches 151 are opened so that the charging process can be repeated.

Based on the level of voltage from sense capacitors 154, A/D converter 158 generates a digital value of a suitable resolution (e.g., one to eight bits) indicative of the level of voltage. The digital values for the array of photo detectors 148 represent a digital image or digital representation of the portion of fingertip 6 positioned over surface 5 of optical pointing device 1. The digital values are stored as a frame into corresponding locations within an array of memory within correlator 160. In one embodiment, each pixel in a frame corresponds to one of the photo detectors 148.

The overall size of the array of photo detectors 148 is preferably large enough to receive an image having several features (e.g., ridges in the whorls of skin). In this way, images of such spatial features produce translated patterns of pixel information as fingertip 6 moves. The number of photo detectors 148 in the array and the frame rate at which their contents are digitized and captured cooperate to influence how fast fingertip 6 can be moved across photo detectors 148 and still be tracked. Tracking is accomplished by correlator 160 by comparing a newly captured sample frame with a previously captured reference frame to ascertain the direction and amount of movement.

In one embodiment, the entire content of one of the frames is shifted by correlator 160 by a distance of one pixel successively in each of the eight directions allowed by a one pixel offset trial shift (one over, one over and one down, one down, one up, one up and one over, one over in the other direction, etc.). That adds up to eight trials. Also, since there might not have been any motion, a ninth trial "null shift" is also used. After each trial shift, those portions of the frames that overlap each other are subtracted by correlator 160 on a pixel by pixel basis, and the resulting differences are preferably squared and then summed to form a measure of similarity (correlation) within that region of overlap. Larger trial shifts are possible, of course (e.g., two over and one down), but at some point the attendant complexity ruins the advantage, and it is preferable to simply have a sufficiently high frame rate with small trial shifts. The trial shift with the least difference (greatest correlation) can be taken as an indication of the motion between the two frames. That is, it provides raw movement information that may be scaled and or accumulated to provide display pointer movement information (ΔX and ΔY) of a convenient granularity and at a suitable rate of information exchange. Correlator 160 automatically detects when fingertip 6 has been removed from surface 5, by sensing that all or a majority of the pixels in the image have become essentially uniform.

In addition to providing digital images to correlator 160, AID converter 158 also outputs digital image data to shutter controller 164. Shutter controller 164, helps to ensure that successive images have a similar exposure, and helps to prevent the digital values from becoming saturated to one value. Controller 164 checks the values of digital image data and determines whether there are too many minimum values or too many maximum values. If there are too many minimum values, controller 164 increases the charge accumulation time of electronic shutter 150. If there are too many maximum values, controller 164 decreases the charge accumulation time of electronic shutter 150.

In operation, images should be acquired at a rate sufficient that successive images differ in distance by no more that perhaps a quarter of the width of the array, or 4 pixels for a 16×16 array of photo detectors 148. Experiments show that a finger speed of 50 mm/sec is not unreasonable, which corresponds to a speed at the array of 800 pixels per second. To meet a requirement of not moving more than four pixels per cycle, a measurement rate of 200 samples per second is needed. This rate is quite practical, and it may be desirable to operate at several times this rate.

Figure 3:
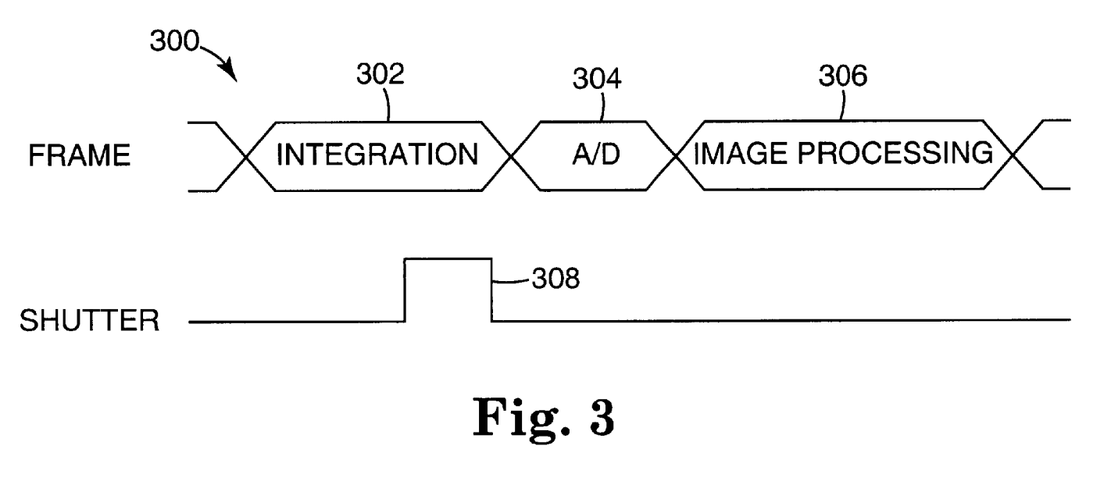
FIG. 3 is a timing diagram illustrating phases of a frame period according to one embodiment of the present invention.

FIG. 3 is a timing diagram illustrating phases of a frame period 300 according to one embodiment of the present invention. A frame period represents the time provided for capturing an entire frame of image data, and for analyzing the image data to determine movement information. Image data need not be captured every frame period. For example, when motion sensor 9 is in a low power mode, an image may only be captured every 10 or 12 frame periods. In one embodiment, when motion sensor 9 is in a fall power mode, an image is captured every frame period.

Frame period 300 includes three phases—an integration phase 302, an analog to digital (A/D) conversion phase 304, and an image processing phase 306. During integration phase 302, light is "collected" by photo detectors 148, and charge accumulates on sense capacitors 154 as described above. During A/El conversion phase 304, the collected charge from sense capacitors 154 is converted into digital data by A/D converter 304 as described above. During image processing phase 306, correlator 160 processes the digital image data and generates incremental movement signals (ΔX, ΔY) as described above.

In previous image sensors, in high power mode, the light source 2 typically remained on for all frame periods, and in low power mode, the light source 2 was typically turned on only during frame periods when images were captured. Regardless of which mode the sensor was in, for each frame period that an image was captured, the light source remained on for that entire frame period. However, light is only needed for a small portion of frame period 300. Light is only needed during a portion of integration phase 302 when electronic shutter 150 is open, allowing light to be collected. Power is unnecessarily consumed by leaving light source 2 on for an entire frame period 300.

In one embodiment of motion sensor 9, light source 2 is controlled by shutter signal 308 from shutter controller 164. Shutter signal 308 is shown in FIG. 3 below frame period 300. As shown in FIG. 2, shutter controller 164 is coupled to electronic shutter 150 and light controller 166. When shutter signal 308 goes high, the high signal causes light controller 166 to turn on light source 2. The high shutter signal 308 also causes electronic shutter 150 to open, thereby allowing charge to accumulate on sense capacitors 154. When shutter signal 308 goes low, the low signal causes light controller 166 to turn off light source 2, and causes electronic shutter 150 to close. Therefore, light source 2 is only on during a portion of integration period 302, rather than during the entire frame period 300 as in previous motion sensors. As described above, the time that electronic shutter 150 is open is varied based on how bright or dark the captured images are. Likewise, the time that light source 2 is on is varied to be on as long as the electronic shutter 150 is open. The time that electronic shutter 150 is open and light source 2 is on is based on the length of time that shutter signal 308 remains high. During the period of time in integration period 302 prior to shutter signal 308 going high, sense capacitors 154 are reset or pre-charged to a desired starting value.

The time that electronic shutter 150 is open is typically substantially less than the time it takes to setup and process one image frame (i.e., a frame period). In one embodiment, a frame period 300 is over 10,000 clock cycles, whereas the electronic shutter 150 may only be open for 1 or 2 clock cycles of a frame period 300. Thus, a 10,000 to 1 reduction in the amount of current used for illumination may be obtained for each frame period 300 by only turning light source 2 on during the time electronic shutter 150 is open. Power is saved regardless of whether motion sensor 9 is in a full power mode, or a low power mode.

Figure 4:
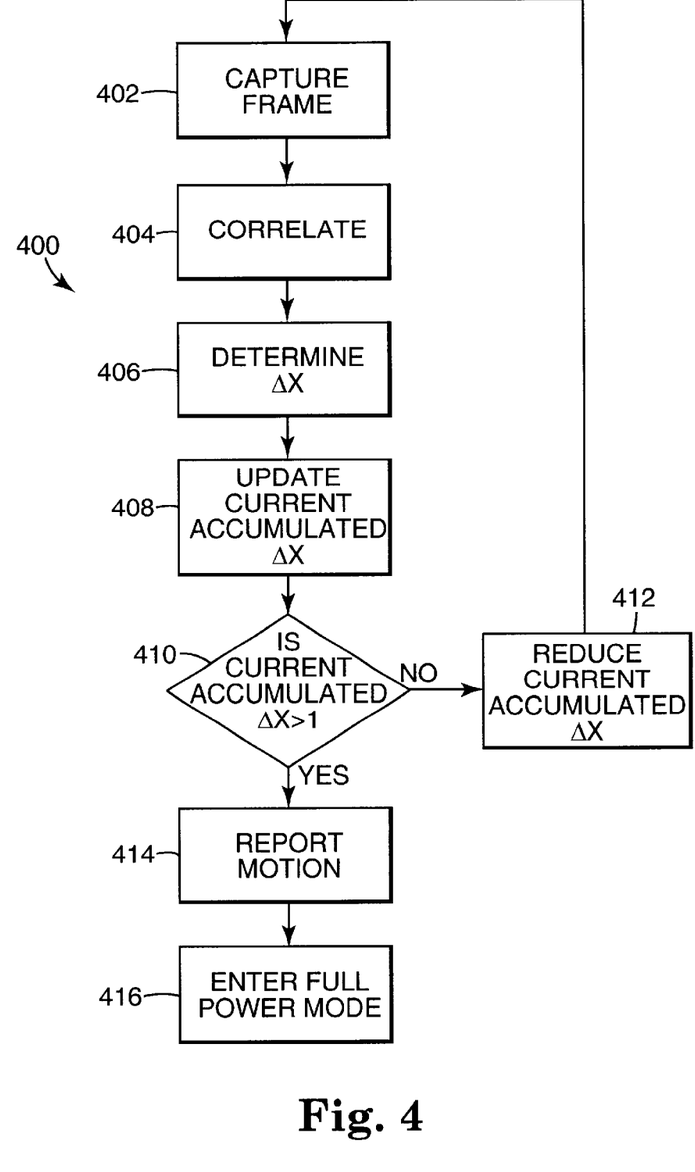
FIG. 4 is a flow diagram illustrating a process for reducing power consumption in an optical motion sensor according to one embodiment of the present invention.

As described above in the Background of the Invention section, in some existing optical motion sensors, an undesirable switch from the low power mode to a full power mode can be caused by noise or reasonably slow drift motions. In one form of the invention, motion sensor 9 implements a process for avoiding this undesirable switch to full power mode, which includes time averaging motion values. FIG. 4 is a flow diagram illustrating one embodiment of a process 400 implemented by motion sensor 9 for reducing power consumption by avoiding such an undesirable switch to full power mode. To simplify the explanation, process 400 is described in the context of one-dimensional movement (i.e., movement in an X direction).

Process 400 begins with motion sensor 9 in a low power mode. In step 402, a frame of image data is captured by motion sensor 9. In step 404, the captured frame is correlated with a previous frame by correlator 160. Based on the correlation, correlator 160 determines ΔX in step 406, which represents the amount of the movement. In step 408, motion sensor 9 updates a stored current accumulated ΔX value by adding the ΔX determined in step 406 to the stored current accumulated ΔX value. Motion sensor 9 then stores the updated value. In step 410, motion sensor 9 determines whether the current accumulated ΔX value (as updated in step 408) is greater than a threshold value. In one embodiment, the threshold value is 1, representing a one pixel movement per frame. If the current accumulated ΔX value is not greater than the threshold value, motion sensor 9 reduces the current accumulated ΔX by a decay factor in step 412 and stores the reduced value. In one embodiment, the decay factor is 0.5. In alternative embodiments, other decay factors are used. After reducing the current accumulated ΔX by the decay factor, motion sensor 9 remains in a low power mode, and jumps to step 402 to repeat the process. If the current accumulated ΔX value is greater than the threshold value in step 410, the ΔX motion data determined in step 406 is reported in step 414. In step 416, motion sensor 9 enters a full power mode.

To further explain process 400, an example with movement values will described. Assume that there has been no motion detected for a long period, and then a first movement occurs that is a one-half pixel movement. Thus, in step 406, correlator 160 determines that ΔX=0.5. In step 408, 0.5 is added to the current accumulated ΔX value (which is about 0 since there has been no movement for a while). Thus, the updated current accumulated ΔX value is 0.5. Since the current accumulated ΔX value is not greater than 1 (step 410), motion sensor 9 reduces the current accumulated ΔX to 0.25 (0.5×decay factor of 0.5) in step 412, and motion sensor 9 remains in a low power mode. Process 400 is then repeated, beginning at step 402.

Assuming that the next ΔX calculated in step 406 is also 0.5, the current accumulated ΔX as updated in step 408 will be 0.75 (0.25+the new ΔX value of 0.5). Since the current accumulated ΔX value (0.75) is not greater than 1 (step 410), motion sensor 9 reduces the current accumulated ΔX value to 0.375 (0.75×decay factor of 0.5) in step 412, and motion sensor 9 remains in a low power mode. Process 400 is again repeated.

Assuming that the next ΔX calculated in step 406 is 1.0, the current accumulated ΔX as updated in step 408 will be 1.375 (0.375+the new ΔX value of 1.0). Since the current accumulated ΔX value (1.375) is greater than 1 (step 410), motion sensor 9 reports the motion (step 414) and enters a fall power mode (step 416).

Process 400 maintains the motion accuracy of motion sensor 9, but effectively reduces the sensitivity of motion sensor 9 to go into a full power mode when small amounts of motion are reported. Power savings are obtained by remaining in low power mode in the presence of noise, vibrations, or slow drift motions that caused previous motion sensors to switch to full power mode. By time averaging motion reports, motions far in the past are "forgotten", and only, current motions have a significant effect in determining whether motion sensor 9 will enter full power mode. When motion stops, the current accumulated ΔX value continues to decay each frame period to zero. If motion reports are oscillating back and forth, for example, between +1 and −1 pixels, the time averaging feature works to cancel out this type of noise.

Although the power savings techniques described herein are described in the context of a finger pointing device, the techniques are also applicable to an optical desktop mouse implementation.

It will be understood by a person of ordinary skill in the art that functions performed by motion sensor 9 may be implemented in hardware, software, firmware, or any combination thereof. The implementation may be via a microprocessor, programmable logic device, or state machine. Components of the present invention may reside in software on one or more computer-readable mediums. The term computer-readable medium as used herein is defined to include any kind of memory, volatile or non-volatile, such as floppy disks, hard disks, CD-ROMs, flash memory, read-only memory (ROM), and random access memory.

Although specific embodiments have been illustrated and described herein for purposes of description of the preferred embodiment, it will be appreciated by those of ordinary skill in the art that a wide variety of alternate and/or equivalent implementations may be substituted for the specific embodiments shown and described without departing from the scope of the present invention. Those with skill in the chemical, mechanical, electromechanical, electrical, and computer arts will readily appreciate that the present invention may be implemented in a very wide variety of embodiments. This application is intended to cover any adaptations or variations of the preferred embodiments discussed herein. Therefore, it is manifestly intended that this invention be limited only by the claims and the equivalents thereof.

What is claimed is:

1. An apparatus for controlling the position of a screen pointer for an electronic device having a display screen, the apparatus comprising:

a light source for illuminating an imaging surface, thereby generating reflected images;

a motion transducer;

a lens for receiving the reflected images and directing the reflected images onto the motion transducer, the motion transducer including an electronic shutter for controlling the amount of time that light is collected for image frames, the motion transducer configured to generate digital representations of the reflected images, the motion transducer configured to generate movement data based on the digital representations of the reflected images, the movement data indicative of relative motion between the imaging surface and the motion transducer; and a controller coupled to the light source for turning the light source on only during the time that light is being collected for an image frame, and for maintaining the light source in an off state when light is not being collected for an image frame wherein the light source is controlled by a shutter signal that also controls the electronic shutter.

2. The apparatus of claim 1, wherein the amount of time that light is collected for image frames is variable, and wherein the amount of time that the light source is turned on for image frames is variable.

3. The apparatus of claim 1, wherein the apparatus includes a low power mode and a full power mode, and wherein the apparatus is configured to calculate a time average of the movement data and determine whether to switch from the low power mode to the full power mode based on the calculated time average of movement data.

4. A method of controlling the position of a screen pointer for an electronic device having a display screen, the method comprising:

directing light from a light source onto an imaging surface, thereby generating reflected images;

focusing the reflected images onto an array of photo detectors;

digitizing output values of the photo detectors, thereby generating digital representations of the reflected images;

correlating at least one version of a first one of the digital representations with at least one version of a second one of the digital representations to generate motion data indicative of relative motion between the imaging surface and the array of photo detectors;

turning the light source off during the digitizing and correlating steps; and adjusting the position of the screen pointer in accordance with the motion data wherein providing an electronic shutter for controlling the length of time that light is collected for each digital representation; and varying the length of time that the light source is on based on the length of time that light is collected for each digital representation.

5. The method of claim 4, and further comprising:

controlling the light source by a shutter signal that also controls the electronic shutter.

6. The method of claim 4, and further comprising:

providing a low power mode and a full power mode;

calculating a time average of the motion data;

determining whether to switch from the low power mode to the full power mode based on the calculated time average.

7. An apparatus for controlling the position of a screen pointer for an electronic device having a display screen, the apparatus comprising:

a light source for illuminating an imaging surface, thereby generating reflected images;

a motion transducer;

a lens for receiving the reflected images and directing the reflected images onto the motion transducer, the motion transducer including an electronic shutter for controlling the a mount of time that light is collected for image frames, the motion transducer configured to generate digital representations of the reflected images, the motion transducer configured to generate movement data based on the digital representations of the reflected images, the movement data indicative of relative motion between the imaging surface and the motion transducer; and a controller for calculating a time average of the movement data, the controller configured to determine whether to switch the apparatus from a low power mode to a full power mode based on the calculated time average.

8. The apparatus of claim 7, wherein the controller is configured to compare the calculated time average of the movement data to a threshold value, and wherein the controller is configured to switch the apparatus from the low power mode to the full power mode if the calculated time average exceeds the threshold value.

9. The apparatus of claim 8, wherein the threshold value is 1 pixel per frame.

10. The apparatus of claim 7, wherein the controller is coupled to the light source, and wherein the controller is configured to turn the light source on only during the time that light is being collected for an image frame.

11. A method of controlling the position of a screen pointer for an electronic device having a display screen, the method comprising:

directing light from a light source onto an imaging surface, thereby generating reflected images;

focusing the reflected images onto an array of photo detectors;

digitizing output values of the photo detectors, thereby generating digital representations of the reflected images;

correlating at least one version of a first one of the digital representations with at least one version of a second one of the digital representations to generate motion data indicative of relative motion between the imaging surface and the array of photo detectors;

turning the light source off during the digitizing and correlating steps;

adjusting the position of the screen pointer in accordance with the motion data;

providing a low power mode and a full power mode;

calculating a time average of the motion data; and determining whether to switch from the low power mode to the full power mode based on the calculated time average.

* * * * *